United States Patent
MacGregor

(10) Patent No.: US 10,875,412 B1
(45) Date of Patent: Dec. 29, 2020

(54) NEXT GENERATION OF URBAN VEHICLE CHARGING STATION

(71) Applicant: AECOM, Los Angeles, CA (US)

(72) Inventor: Alastair Niall MacGregor, Aliso Viejo, CA (US)

(73) Assignee: AECOM, Los Angeles, CA (US)

( * ) Notice: Subject to any disclaimer, the term of this patent is extended or adjusted under 35 U.S.C. 154(b) by 124 days.

(21) Appl. No.: 16/111,088

(22) Filed: Aug. 23, 2018

Related U.S. Application Data

(60) Provisional application No. 62/531,272, filed on Jul. 11, 2017.

(51) Int. Cl.
| | |
|---|---|
| *B60L 53/12* | (2019.01) |
| *E01D 18/00* | (2006.01) |
| *H01M 10/44* | (2006.01) |

(52) U.S. Cl.
CPC ............ *B60L 53/12* (2019.02); *E01D 18/00* (2013.01); *H01M 10/44* (2013.01); *H01M 2220/20* (2013.01)

(58) Field of Classification Search
CPC ........ B60L 53/12; E01D 18/00; H01M 10/44; H01M 2220/20; E04H 6/40; E04H 6/08; E04H 6/10
USPC ....................................................... 105/420
See application file for complete search history.

(56) References Cited

U.S. PATENT DOCUMENTS

| | | | | |
|---|---|---|---|---|
| 1,782,369 A | * | 11/1930 | Smith, Jr. ................. | E04H 6/10 52/175 |
| 2,689,384 A | * | 9/1954 | Burn ........................ | E04H 6/10 52/175 |
| 6,129,025 A | * | 10/2000 | Minakami ............... | B60L 50/51 104/88.01 |
| 2016/0236572 A1 | * | 8/2016 | Abe ........................ | B60L 5/005 |
| 2017/0197518 A1 | * | 7/2017 | Myers ...................... | B60L 7/10 |

* cited by examiner

*Primary Examiner* — Mark T Le

(74) *Attorney, Agent, or Firm* — Knobbe, Martens, Olson & Bear LLP

(57) ABSTRACT

A structure for effectively providing charging capacity for electric vehicles within urban environments in a safe and space conscious manner uses a new vertical building typology. A modular helix ramp structure with integrated wireless charging panels/coils charges vehicles as they drive up and down the structure without the need to physically park the vehicle in a traditional parking structure. A license plate reader, transponder or other vehicle identification technology registers a vehicle entering the tower, authorize purchase and initiate the up/down charging cycle thru the helix structure. The structure reduces the building footprint required to charge a given number of vehicles. This consolidates electrical infrastructure connection requirements to a single location, and because the vehicles are not occupied during charging exposure of vehicle inhabitants to electromagnetic radiation.

23 Claims, 4 Drawing Sheets

NEXT GENERATION OF URBAN VEHICLE CHARGING STATION

CROSS-REFERENCE TO PRIOR APPLICATIONS

The present application is based on and claims the benefit and priority of U.S. Provisional Patent Application No. 62/531,272 filed on 11 Jul. 2017.

U.S. GOVERNMENT SUPPORT

Not Applicable

BACKGROUND OF THE INVENTION

Area of the Art

The present application is in the area of charging stations for electric vehicle and more specifically discloses a new structure for such stations.

Description of the Background of the Invention

Electric vehicles are primarily charged through a physical plug-in connection to the electrical supply. Recent technological advances have, however, evolved the next generation of charging which allows for wireless charging of the vehicle without a physical connection being made. These technologies have been successfully leveraged in individual parking spaces and most recently in roadways themselves using induction charging techniques that transfer power wirelessly from supply coils located in the roadway to a receiving coil mounted on the underside of the vehicle.

Problem Statement

Both locations for wireless vehicle charging, unfortunately have significant constraints that limit their ability to successfully service the anticipated growth in Electric Vehicles (EVs) and Autonomous Vehicles (AV) including, but not limited to, daily charge capacity limitations; viability within an urban environment due to inherent space constraints; existing infrastructure located beneath the roadways; access to electrical support infrastructure and capacity to power the required daily charges; the impact of weather; and potential health and safety issues associated with high capacity, rapid wireless charging and the proximity of vehicle occupant to the wireless charging process; and the ongoing maintenance of distributed resources.

SUMMARY OF THE INVENTION

Solution Statement

To more effectively provide the necessary charging capacity within urban communities in a safe and space conscious manner, a new building typology that takes what has been seen as a horizontal infrastructure challenge and transform it into a vertical piece of urban infrastructure is employed.

The core functionality that is provided by the invention is described below and shown in the drawings:
1. A modular single or double helix ramp structure with integrated wireless charging panels/coils charges vehicles as they drive up and down the structure without the need to physically park the vehicle in a traditional parking structure;
2. The central core of the helix will both support the helix; house additional control, energy generation and storage equipment; and facilitate maintenance to the systems; and
3. A license plate reader, transponder or other vehicle identification technology is used to register a vehicle entering the tower, authorize purchase and initiate the up/down charging cycle thru the helix structure during which they achieve the desired level of charge.

This solution robustly solves the stated problem statement by:
1. Reducing the building footprint required to charge a given number of vehicles per day;
2. Consolidating electrical infrastructure connection requirements to support a network of helix nodes rather than disparate charging stations, thereby increasing the ability for a urban community to adopt electrification of vehicles by focusing the necessary electrical infrastructure upgrades required to support the charging capacity;
3. Providing weather protection during the charging process;
4. Reduce the potential health and safety issues associated with high capacity, rapid wireless charging and the proximity of vehicle occupant to the wireless charging process and associated electromagnetic radiation by housing the charging process within a secure environment that is not readily accessible to pedestrians;
5. By removing the charging process from the roadway, the vehicle speed is no longer determined by the speed of traffic. As a result, the speed can be minimized, consequently increasing the effectiveness of the charging process and reducing the overall distance traveled during the charging process; and
6. Centralizing the maintenance requirements associated with the large scale daily charging needs to a more viable operational function.

DETAILED DESCRIPTION OF THE INVENTION

Figure 1:
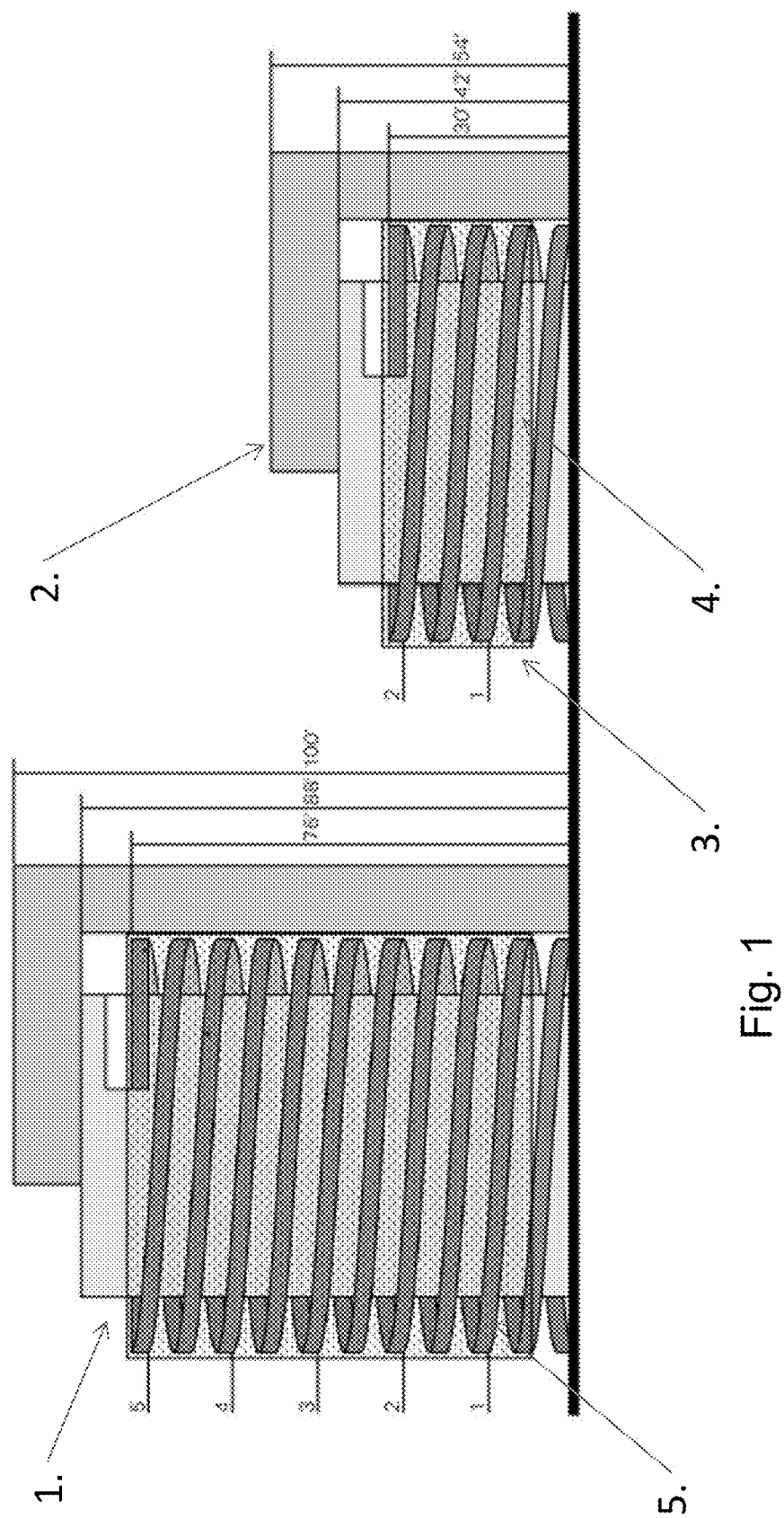
FIG. 1 is a representative section diagram of the double helix embodiment of the present invention.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved electric vehicle charging station Modular Approach:

The charging tower is both modular and scalable, with the length of charging ramp readily increased through the installation of a new module. Through this process, the tower capacity, both in terms of vehicle throughput and maximum charge offered, allowing the solution to evolve as the need for electrical charging within urban centers increases. The drawings show structures with curved, helically arranged ramps. It will be understood that straight ramps in a scissors configuration can be substituted. The helix is shown as being "double stranded" with separate "up" and "down" ramps. However, the straight (scissor structure) or the curved (helical structure) ramps can alternatively be designed to handle two-way traffic with a "reversing" or turn around area provided for the vehicles to reverse direction. In any case, the structure is modular in design to facilitate different heights of charging tower to accommodate the variables associated with each location—height constraints, capacity limitations and throughput capacity. The helix structure can be provided in a number of different radii to allow use with different vehicles, from passenger vehicles to larger buses and trucks, having different minimum turning radii. Depending upon the proposed application, a different radius of helix and number of vertical modules may be utilized. In the drawings the entry point and the exit point are shown as being on the same level; however, depending on surrounding structures and available real estate, they can be on different levels and point in different directions (e.g., at the 12 o'clock and six o'clock positions on a circular structure).

Charging Mechanism:

The charging mechanism embedded in or mounted upon the ramp can transfer energy to the vehicle through wireless technologies including induction, conduction or audio/light waves. The transmitter elements (induction coils, conduction slots, sound generators and/or light generators) are integrated into the ramp structure as either a cast in place component or as a lay in component mounted to the structural ramp. Multiple transmitters can be mounted in series along the full length of the helix structure. The transmitters can be configured to allow the horizontal variability in vehicle path up/down the helix tower. The transmitters can be controlled by a control system that creates a "charging wave" that matches the speed of the vehicle moving through the structure. The receiving element within each vehicle will control the rate and amount of energy transferred to the vehicle during the charging process. The charging mechanism is capable of incorporating charging coils ranging in capacity from 5 kW to 1000 kW, based upon the deployment of the tower. The actual charge rate leveraged during the charging process will be controlled by the vehicle onboard charge controller based upon the individual vehicle constraints.

Vehicle Applicability:

Autonomous vehicles (AVs) will be capable of traversing the Charging Helix unmanned, controlling when to seek a charge and the amount of charge requested. That is, AVs will determine the amount of charge when they visit the charging helix based upon their anticipated future use, proximity to a tower and the current helix available capacity. For example, an AV could be at 50% charged but has an impending reservation to go from LAX to San Diego which will require a full charge. The helix would be communicating so that the AV network can ping the helix network and know where there is capacity and where there is none (similar to wait time information used in other industries). Traditional electric vehicles (EVs) could also leverage the charging helix through the use of a robotic sled. The EV would be driven onto a robotic sled fitted with a charging receiver panel, converter and traditional manual charging cable that is then plugged into the EV to allow for traditional charging. The autonomous sledge would then traverse the charging helix to achieve the requested charge. Multiple robotic sledges can be available on the site because traditional EVs without wireless charging ability will be common for some time to come.

EV Vehicle Sledge:

The core functionality that provided by the sledge is described below and detailed in FIG. 2 (see below):

1. The EV that will be driven onto the robotic sledge that should be capable of autonomously circumnavigating the helix charging tower;

2. The sled is fitted with a charging receiver panel to facilitate the transfer of the energy from the helix tower; and 3. An onboard controller controls the wireless charging receiver in the sledge and the transfer of energy from the receiver panel to a traditional plug in EV charging cable.

FIG. 1 shows a cross-section diagram of the helical charging tower. The overall dimensions 1 of the tower depends on the type of vehicle to be charged and the average turning radius of the vehicle as well as the amount of charge that needs to be delivered. If the goal is fleet charging for AVs, then the radius might be fairly small; whereas if the charging tower is intended to handle commercial vehicles including some trucks, the radius would be large. In the same way if the target vehicles are large the tower ramp may have to be longer or the transit speed slower to provide an opportunity to fully charge large, high capacity batteries. Control centers 2 for Connected AVs (CAVs) can be incorporated in a head house of the tower. The target vehicle 3 either travels up and down the ramp either independently or hosted on a charging sled while it receives its electric charge from the built-in dynamic wireless charger 5 built into the ramp. Because the helix 4 is modular in nature, the tower height can be varied as required.

Figure 2:
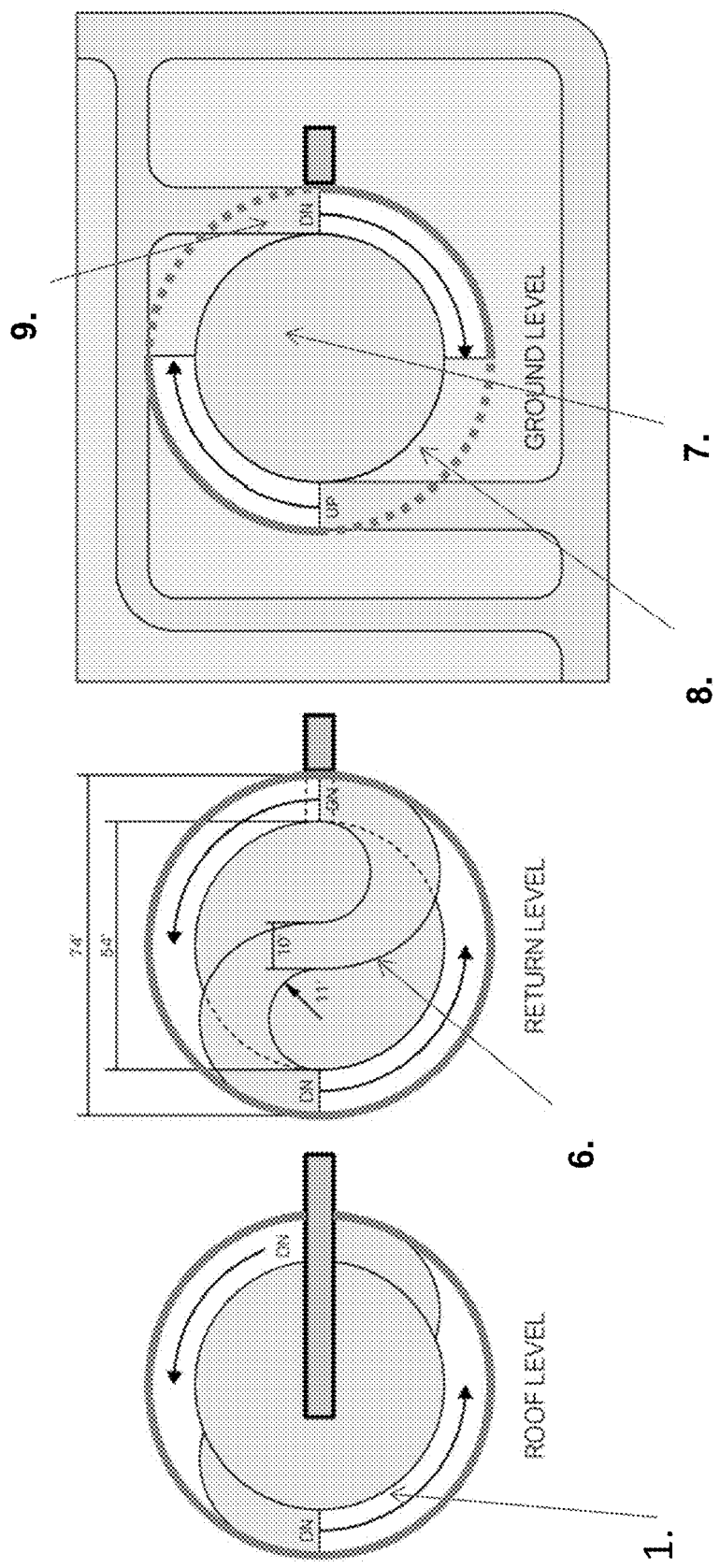
FIG. 2 is a representative plan diagram of the double helix embodiment of the present invention.

FIG. 2 shows a plan view of the tower. Again, the dimensions 1 depend on type of vehicle and turning radius. The terminal level 6 of the helix is configured as necessary to transition from "up" to "down" travel. The track can be configured to support either one-way or two-way travel. The vertical structure 7 is entered at grade and can extend either upwards (a tower, as shown) or downwards as a "buried" or "inverted" tower depending available real estate. The tower core 8 can readily incorporate multiple equipment rooms so as to hold energy storage, generation, charging and CAV control systems as well as micro-grid facilities. Generally, a toll station 9 registers the vehicle upon vehicle entry so that cost of the electricity and charging service are automatically covered.

Figure 3:
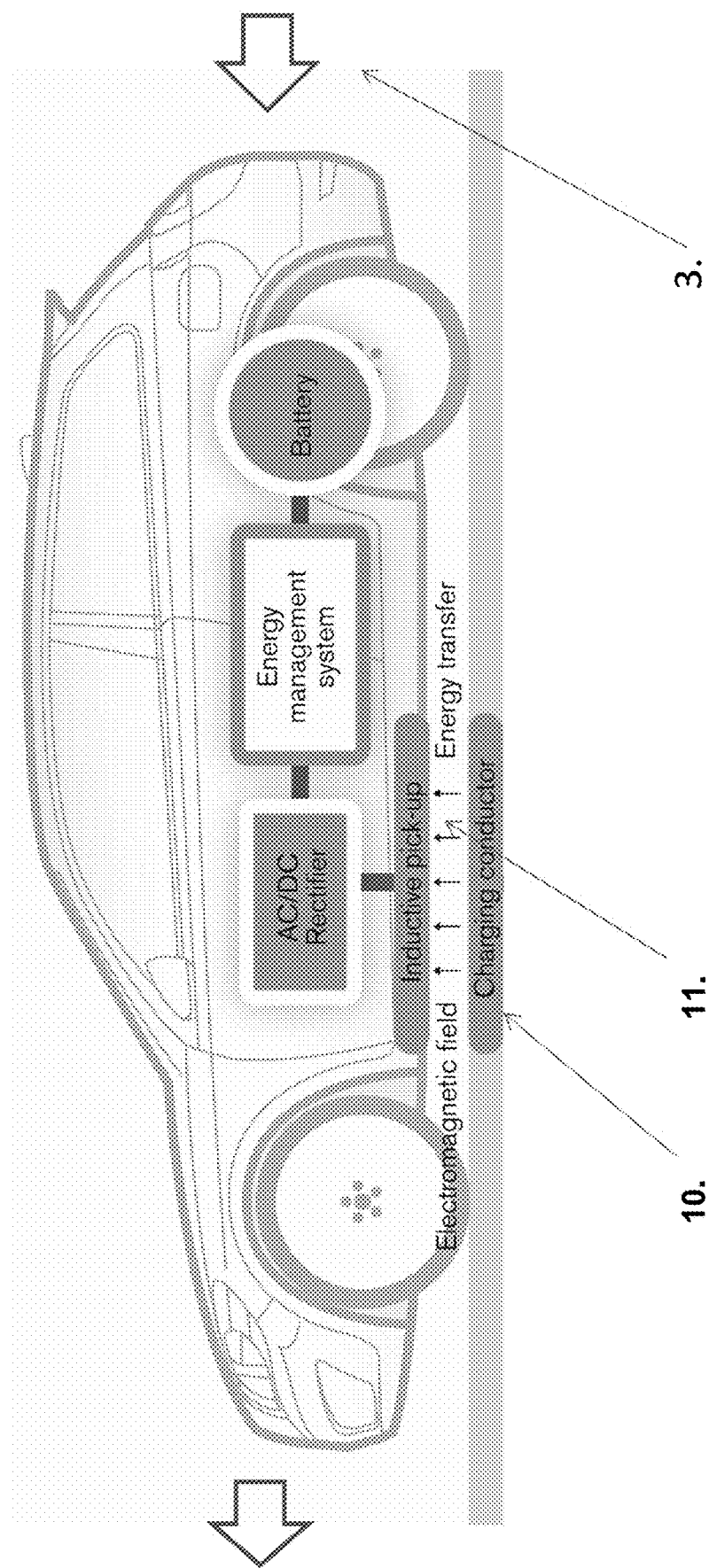
FIG. 3 is a diagram of the direct wireless charging which can be employed with all embodiments of the present invention.

As shown in FIG. 3, charging conductors 10 are embedded into or mounted on the helix ramp. A dynamic transfer system 11 matches the charging areas that are energized to the vehicle speed. This limits energy loss as the vehicle 3 moves at the optimal speed along the ramp. As already mentioned, the vehicle speed can be adjusted to optimize transit time and charge level. Adjacent vehicles 3 will move at the same speed, but different groups of vehicles can have different speeds. After a "one mile per hour" train of vehicles exits the ramp, a "two mile per hour" group can enter.

Figure 4:
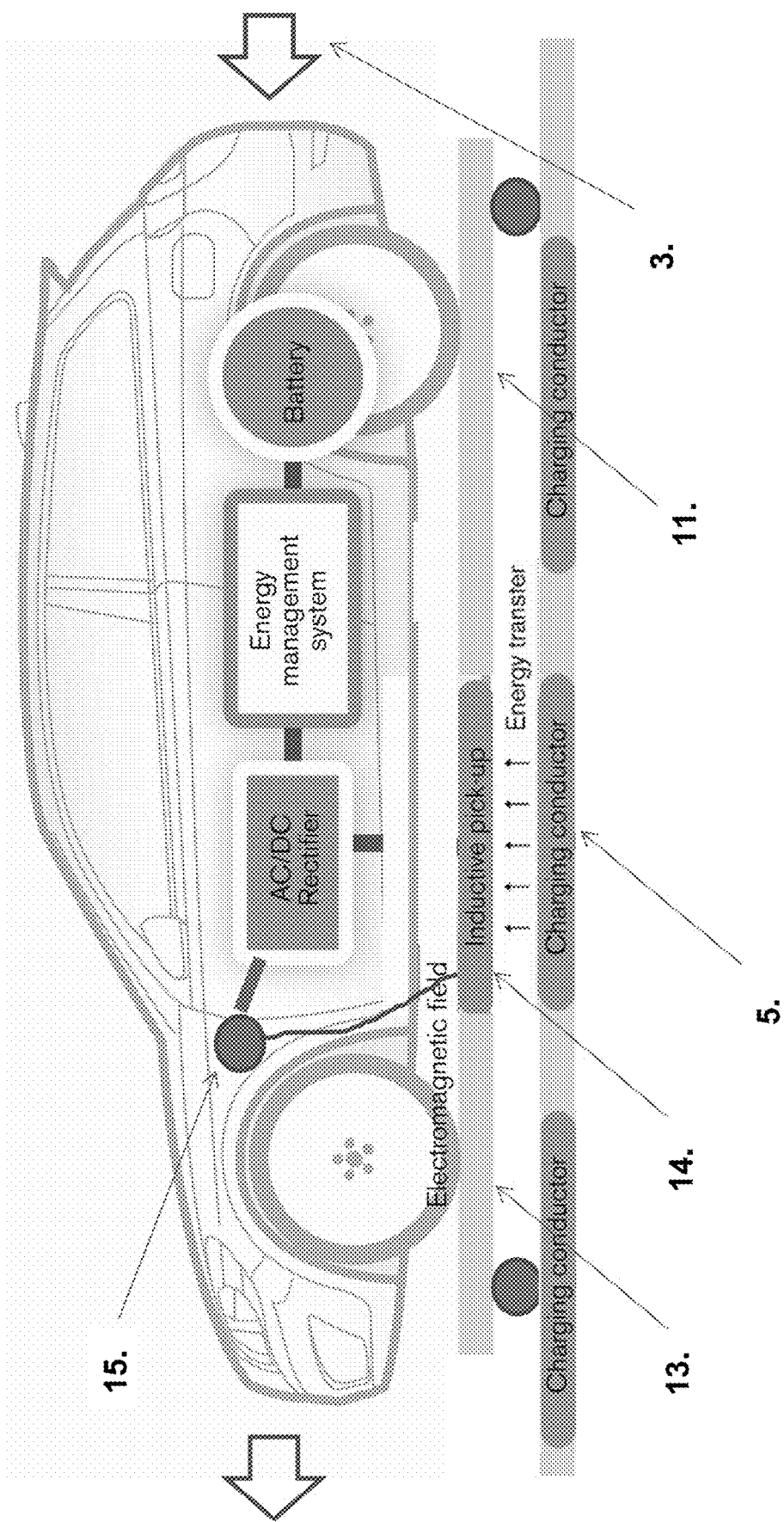
FIG. 4 is a diagram of the robotic sledge which can be used with all embodiments of the present invention.

FIG. 4 illustrates details of the robotic sled or sledge that is used to charge convention EVs that are unable to navigate the charging helix autonomously. The convention EV 12 is loaded onto an autonomous charging sled 13 that has built-in inductive coils 14. The autonomous sled 14 than acts like an AV and drives along the helix as dynamic wireless energy transfer occurs between the inductive coils 14 and the charging conductors 5. Again, speed of motion is controlled to optimize charging. A conductor receiving power from the pick-up coil 14 is plugged into the normal charging port 15 of the EV.

Helix Availability Control:

The towers can be controlled as a matrix of connected locations, enabling users to understand the current charging availability and route their vehicles to the charging helix with the necessary availability.

Power Generation and Storage:

The core of the tower is capable of incorporating onsite power generation, such as fuel cells, and onsite electrical storage, such as batteries, through which the tower would generate some/all the power needed to support the vehicle charging process. The tower will also be able to fully integrate into a local micro-grid.

Unique/Non-Obvious Benefits:

The inventive solution provides a number of unique and non-obvious benefits over both a traditional charging solution and the way in which wireless charging is being deployed as a piece of horizontal infrastructure:

1. Reduced urban footprint; by creating a vertical solution, the amount of land required to provide the required charging capacity is significantly reduced when compared to both the creation of a charging/parking lot solution or roadway charging; this, therefore, makes it better aligned with the city/urban landscape where land is often at a premium and will present a significant roadblock to mass adoption of AV/EVs within urban environments;

2. Reduced vehicle traffic; by distributing the charging process into multiple charge helices located across the urban landscape, the local traffic issues that can result from centralized AV fleet charging locations can be mitigated;

3. Reduced impact of Weather/Elements; by enclosing the charging process within a weather impermeable structure, the equipment is protected and its life is extended while the required operation and maintenance (O&M) costs are reduced; and 4. Reduced Health and Safety problems; although the impacts of the wireless charging process on vehicle occupants is not yet known, the present invention whereby the vehicle is inherently empty during the charging process eliminates any potential adverse effect of wireless charging on vehicle occupants.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A building structure for charging an electric vehicle while the vehicle navigates the building structure, the building structure comprising:

a ramp system comprising:

an entry point for entering the building structure;

an exit point for leaving the building structure; and a vehicle pathway between the entry point and the exit point, the vehicle pathway comprising a vertically ascending ramp and a vertically descending ramp so that the electric vehicle can move up the vertically ascending ramp and down the vertically descending ramp; and a charging mechanism disposed along at least a portion of a length of the vehicle pathway and embedded into and/or mounted on the vertically ascending and vertically descending ramps, the charging mechanism configured to charge a battery of the vehicle while the vehicle moves up the vertically ascending ramp and down the vertically descending ramp, wherein the building structure is in communication with a system in communication with a network of other building structures having charging locations, the system configured to determine a charging location with an available charging capability for charging the vehicle.

2. The building structure of claim 1, wherein the entry point and exit point are on one level of the building structure.

3. The building structure of claim 1, wherein the entry point and exit point are on different levels of the building structure.

4. The building structure of claim 1, wherein the vertically ascending and vertically descending ramps serve two-way traffic movement and a reversing area is provided so that the vehicle can change directions.

5. The building structure of claim 1, wherein the building structure is enclosed within a weather impermeable building structure.

6. The building structure of claim 1, wherein the vertically ascending and vertically descending ramps are curved in a helical configuration.

7. The building structure of claim 1, wherein the vertically ascending and vertically descending ramps are substantially straight and are in a scissors configuration.

8. The building structure of claim 1 further comprising a robotic sled to enable a non-autonomous electric vehicle to navigate the vehicle pathway.

9. The building structure of claim 1, wherein at least a portion of the vehicle pathway is depressed below ground level so that the vehicle first descends the vertically descending ramp and then ascends the vertically ascending ramp.

10. The building structure of claim 1, wherein at least a portion of the vehicle pathway is elevated above ground level so that the vehicle first ascends the vertically ascending ramp and then descends the vertically descending ramp.

11. The building structure of claim 1, wherein the charging mechanism comprises a plurality of segmented charging conductors spaced apart along the at least a portion of the length of the vehicle pathway.

12. The building structure of claim 1, wherein the charging mechanism extends along the entire length of the vehicle pathway between the entry point and the exit point.

13. The building structure of claim 1, wherein the building structure comprises a tower including a core structure configured to supply electrical power to the charging mechanism.

14. A building structure for charging an electric vehicle, the building structure comprising:

a ramp system comprising:

an entry point for entering the building structure;

an exit point for leaving the building structure; and a vehicle pathway between the entry point and the exit point, the vehicle pathway comprising a vertically ascending ramp and a vertically descending ramp;

a charging mechanism disposed along at least a portion of a length of the vehicle pathway between the entry point and the exit point, the charging mechanism embedded in or mounted on the vehicle pathway, the charging mechanism configured to charge a battery of the vehicle while the vehicle moves up the vertically ascending ramp and down the vertically descending ramp; and a core structure configured to supply electrical power to the charging mechanism, wherein the building structure is in communication with a system in communication with a network of other building structures having charging locations, the system configured to determine a charging location with an available charging capability for charging the vehicle.

15. The building structure of claim 14, wherein the charging mechanism comprises a plurality of segmented charging conductors spaced apart along the at least a portion of the length of the vehicle pathway.

16. The building structure of claim 14, wherein the ramp system comprises the vertically descending ramp and the vertically ascending ramp, the charging mechanism disposed along the vertically descending ramp and the vertically ascending ramp.

17. The building structure of claim 14, wherein the core structure is connected to an external power grid.

18. The building structure of claim 14, wherein the core structure comprises a fuel cell to generate at least a portion of the electrical power.

19. The building structure of claim 14, wherein the core structure comprises a battery to store at least some of the electrical power.

20. The building structure of claim 1, wherein the building structure is configured to connect with a network of one or more electric vehicles.

21. The building structure of claim 20, wherein the building structure is configured to receive a request for charging from the one or more electric vehicles and to transmit to the one or more electric vehicles an indication of an available charging capacity of the building structure.

22. The building structure of claim 14, wherein the building structure is configured to connect with a network of one or more electric vehicles.

23. The building structure of claim 22, wherein the building structure is configured to receive a request for charging from the one or more electric vehicles and to transmit to the one or more electric vehicles an indication of an available charging capacity of the building structure.

\* \* \* \* \*